US007373728B2

(12) United States Patent
Ferman et al.

(10) Patent No.: US 7,373,728 B2
(45) Date of Patent: May 20, 2008

(54) RING INSERT KIT FOR SCISSORS AND TEMPLATE FOR USE THEREWITH

(76) Inventors: Randall Scott Ferman, 45 Sagamore Rd., Millburn, NJ (US) 07041; Maurice T. Ferman, 1604 Tealwood Ct., Keller, TX (US) 76248

(*) Notice: Subject to any disclaimer, the term of this patent is extended or adjusted under 35 U.S.C. 154(b) by 45 days.

(21) Appl. No.: 10/818,925

(22) Filed: Apr. 6, 2004

(65) Prior Publication Data

US 2005/0217123 A1 Oct. 6, 2005

(51) Int. Cl.
*G01B 3/34* (2006.01)
*B26B 13/20* (2006.01)

(52) U.S. Cl. .......................... 33/514.1; 30/232; 30/341

(58) Field of Classification Search .................. 33/512, 33/514.2, 555.2, 562, 563; 30/230–232, 30/254, 298, 340, 341
See application file for complete search history.

(56) References Cited

U.S. PATENT DOCUMENTS

| | | | |
|---|---|---|---|
| 970,406 A | | 9/1910 | Tindall |
| 1,357,200 A | | 10/1920 | Kiefer |
| 2,370,026 A | | 2/1945 | Elia |
| 2,640,264 A | | 6/1953 | Sullivan et al. |
| 2,669,993 A | | 2/1954 | Curutchet |
| 2,677,179 A | | 5/1954 | Servilla |
| 3,825,020 A | | 7/1974 | Myers |
| 3,840,990 A | | 10/1974 | Laurenti |
| 3,974,563 A | | 8/1976 | Koch |
| 4,091,539 A | | 5/1978 | Watanabe |
| 4,173,074 A | | 11/1979 | Newman et al. |
| 4,254,551 A | * | 3/1981 | Megna et al. ................. 30/341 |
| D277,450 S | | 2/1985 | Hayashi |
| 5,109,608 A | * | 5/1992 | Pracht ......................... 30/341 |
| 5,125,159 A | | 6/1992 | Brenton et al. |
| 5,170,570 A | | 12/1992 | Mays, Jr. |
| 5,353,513 A | * | 10/1994 | Round ....................... 33/555.2 |
| D384,260 S | | 9/1997 | Dunch |
| 5,720,103 A | | 2/1998 | West et al. |
| 5,778,540 A | | 7/1998 | Huang |
| 5,781,999 A | | 7/1998 | Chang |
| 5,819,416 A | | 10/1998 | Robinson et al. |
| 5,987,757 A | | 11/1999 | Schmidt et al. |
| 6,000,138 A | | 12/1999 | Bornancini |
| D426,441 S | | 6/2000 | Sotokawa |
| D427,869 S | | 7/2000 | Zoiss et al. |
| D429,982 S | | 8/2000 | Kamrath |
| 6,397,478 B1 | | 6/2002 | Bornancini |
| 6,739,057 B2 | * | 5/2004 | Schallenberg ................ 30/232 |
| 2002/0095796 A1 | * | 7/2002 | Whitehall et al. ............ 30/232 |
| 2003/0131489 A1 | * | 7/2003 | Hsiao ........................ 33/555.2 |
| 2005/0204569 A1 | * | 9/2005 | Brenton ....................... 30/341 |

* cited by examiner

*Primary Examiner*—G. Bradley Bennett
(74) *Attorney, Agent, or Firm*—Lerner, David, Littenberg, Krumholz & Mentlik, LLP

(57) ABSTRACT

A ring insert kit includes a plurality of ring inserts and optional a selection template. The ring inserts are arranged in predetermined sizes for selection using the template. The ring inserts are insertable into one or more finger receiving openings within a pair of scissors for reducing the opening size to accommodate the size of the user's fingers.

44 Claims, 5 Drawing Sheets

RING INSERT KIT FOR SCISSORS AND TEMPLATE FOR USE THEREWITH

BACKGROUND OF THE INVENTION

Scissors are universally used in the cutting of hair in beauty salons and in barbershops. Although scissors are manufactured in various designs and constructions, they almost always incorporate two pivotably connected blades each having coacting cutting regions on one side of the pivot point and handle portions provided on the other side of the pivot point with finger and thumb supports. Manipulation by the operator of the scissors by relative movement of the operator's fingers and thumb causes corresponding pivotable movement of the cutting blades whereby the cutting regions cooperate to cut hair positioned therebetween.

The finger openings provided in a pair of scissors, e.g., ring finger and thumb, are often standardized by the manufacturer. However, scissors are sold to and used by multiple operators whose finger sizes vary greatly. It is therefore unusual that stock finger and thumb openings in a pair of purchased scissors will properly fit the operator. In this regard, the openings are oversized by the manufacturer so as to accommodate ring inserts that allow personalizing of the openings to fit one's fingers and thumb. Scissors having inserts of various construction are known from U.S. Pat. Nos. 970,406, 1,357,200, 2,640,264, 3,840,990, 3,974,563, 4,091,539, 5,720,103, 5,778,540, 5,781,999, 5,819,416, 5,987,757, 6,000,138 and 6,397,478.

There are also known polymer ring inserts that can be removably inserted into the finger and thumb openings of a pair of scissors to reduce their effective size. These ring inserts have been provided each of a different outside diameter and a different inside diameter. Although these ring inserts can modify a pair of scissors to accommodate certain finger and thumb sizes, there are operators whose finger sizes do not match appropriately those of the known ring inserts. As a result, the operator will select the best possible size to accommodate the operator's fingers. However, the ring insert may still result in the finger or thumb opening being either too large or too small. This can result in improper fit of the scissors, potentially causing carpal tunnel syndrome with prolonged use.

There is therefore the need for ring inserts that can be provided in a kit containing a plurality of inserts that more correctly fit the user's fingers, as well as a template for proper selection of the ring inserts.

SUMMARY OF THE INVENTION

In accordance with one embodiment of the present invention there is described a scissors insert kit comprising a plurality of ring inserts having an outside diameter and an inside diameter, the plurality of ring inserts forming at least one group comprising at least a first ring insert and a second ring insert, the first and second ring inserts within the at least one group having the same outside diameter and a different inside diameter.

In accordance with another embodiment of the present invention, there is described a scissors insert kit comprising a plurality of polymer ring inserts each having an outside diameter and an inside diameter, the plurality of ring inserts forming a plurality of groups, each group comprising at least a first ring insert and a second ring insert, the first and second ring inserts within a group having the same outside diameter and a different inside diameter, wherein the outside and inside diameters of the first and second ring inserts within one of the groups are different from the outside and inside diameters of the first and second ring inserts in another one of the groups.

In accordance with another embodiment of the present invention, there is described a template for selecting a ring insert for a scissors based upon a person's finger size, the template comprising means for identifying the size of a person's finger between a first and second knuckle thereof, and means for associating a ring insert of predetermined size with the identified size of the person's finger.

In accordance with another embodiment of the present invention, there is described a template for selecting a ring insert for a scissors based upon a person's finger size, the template comprising a plate having a plurality of holes each of a different size for identifying the size of a person's finger between a first and second knuckle thereof, and indicia selected from the group consisting of numbers, letters, symbols, colors and combinations thereof uniquely associated with one of the holes and one of the ring inserts.

In accordance with another embodiment of the present invention, there is described a template for selecting a ring insert for a scissors based upon a person's finger size, the template comprising an illustration of a person's finger and a plurality of reference marks provided on the illustration between at least the locations of a person's first and second knuckles for identifying the size of the person's finger therebetween, and indicia selected from the group consisting of numbers, letters, symbols, colors and combinations thereof uniquely associated with one of the reference marks and one of the ring inserts.

In accordance with another embodiment of the present invention, there is described a kit for modifying a pair of scissor, the kit comprising a plurality of ring inserts having an outside diameter and an inside diameter, the plurality of ring inserts forming at least one group comprising at least a first ring insert and a second ring insert, the first and second ring inserts within the at least one group having the same outside diameter and a different inside diameter; and a template for selecting a ring insert from the at least one group for a scissors based upon a person's finger size, the template comprising means for identifying the size of a person's finger between a first and second knuckle thereof, and means for associating a ring insert of predetermined size with the identified size of the person's finger.

In accordance with another embodiment of the present invention, there is described a kit for modifying a pair of scissors, the kit comprising a plurality of polymer ring inserts each having an outside diameter and an inside diameter, the plurality of ring inserts forming a plurality of groups, each group comprising at least a first ring insert and a second ring insert, the first and second ring inserts within a group having the same outside diameter and a different inside diameter, wherein the outside and inside diameters of the first and second ring inserts within one of the groups are different from the outside and inside diameters of the first and second ring inserts in another one of the groups; and a template for selecting a ring insert from one of said groups for a scissors based upon a person's finger size, the template comprising a plate having a plurality of holes each of a different size for identifying the size of a person's finger between a first and second knuckle thereof, and indicia selected from the group consisting of numbers, letters, symbols, colors and combinations thereof uniquely associated with one of the holes and one of the ring inserts.

In accordance with another embodiment of the present invention, there is described a kit for modifying a pair of scissors, the kit comprising a plurality of polymer ring inserts each having an outside diameter and an inside diameter, the plurality of ring inserts forming a plurality of groups, each group comprising at least a first ring insert and a second ring insert, the first and second ring inserts within a group having the same outside diameter and a different inside diameter, wherein the outside and inside diameters of the first and second ring inserts within one of the groups are different from the outside and inside diameters of the first and second ring inserts in another one of the groups; and a template for selecting a ring insert from one of the groups for a scissors based upon a person's finger size, the template comprising an illustration of a person's finger and a plurality of reference marks provided on the illustration between at least the locations of a person's first and second knuckles for identifying the size of the person's finger therebetween, and indicia selected from the group consisting of numbers, letters, symbols, colors and combinations thereof uniquely associated with one of the reference marks and one of the ring inserts.

In accordance with another embodiment of the present invention, there is described a method for selecting a ring insert for a pair of scissors, the method comprising providing a plurality of ring inserts having an outside diameter and an inside diameter, the plurality of ring inserts forming at least one group comprising at least a first ring insert and a second ring insert, the first and second ring inserts within the at least one group having the same outside diameter and a different inside diameter; measuring a person's finger size using a template; and selecting one of the ring inserts by associating at least one of the ring inserts with the measured size of the person's finger.

In accordance with another embodiment of the present invention, there is described a method for selecting a ring insert for a pair of scissors, the method comprising providing a plurality of polymer ring inserts each having an outside diameter and an inside diameter, the plurality of ring inserts forming a plurality of groups, each group comprising at least a first ring insert and a second ring insert, the first and second ring inserts within a group having the same outside diameter and a different inside diameter, wherein the outside and inside diameters of the first and second ring inserts within one of the groups are different from the outside and inside diameters of the first and second ring inserts in another one of the groups; measuring the size of a person's finger by inserting the person's finger into at least one of a plurality of holes each of a different size; associating each of the holes with one of the plurality of ring inserts, and selecting one of the ring inserts from one of the groups based upon the measured size of the person's finger.

In accordance with another embodiment of the present invention, there is described a scissors insert kit comprising a plurality of ring inserts having an outside diameter and an inside diameter, the plurality of ring inserts forming at least one group comprising at least a first ring insert and a second ring insert, the first and second ring inserts within at least one group having the same outside diameter and a different inside diameter, wherein the inside diameter of the ring inserts is in the range of about 4.25 millimeters to about 9.75 millimeters smaller than the outside diameter of the ring inserts.

In accordance with another embodiment of the present invention, there is described a scissors insert kit comprising a plurality of ring inserts having an outside diameter and an inside diameter, the plurality of ring inserts forming at least one group comprising at least a first ring insert and a second ring insert, the first and second ring inserts within at least one group having the same outside diameter and a different inside diameter, wherein the inside diameter of the ring inserts is in the range of about 18% to about 40% smaller than the outside diameter of the ring inserts.

BRIEF DESCRIPTION OF THE DRAWINGS

The above description, as well as further objects, features and advantages of the present invention will be more fully understood with reference to the following detailed description of Ring Insert Kit For Scissors And Template For Use Therewith, when taken in conjunction with the accompanying drawings, wherein.

DETAILED DESCRIPTION OF PREFERRED EMBODIMENTS

Figure 1:
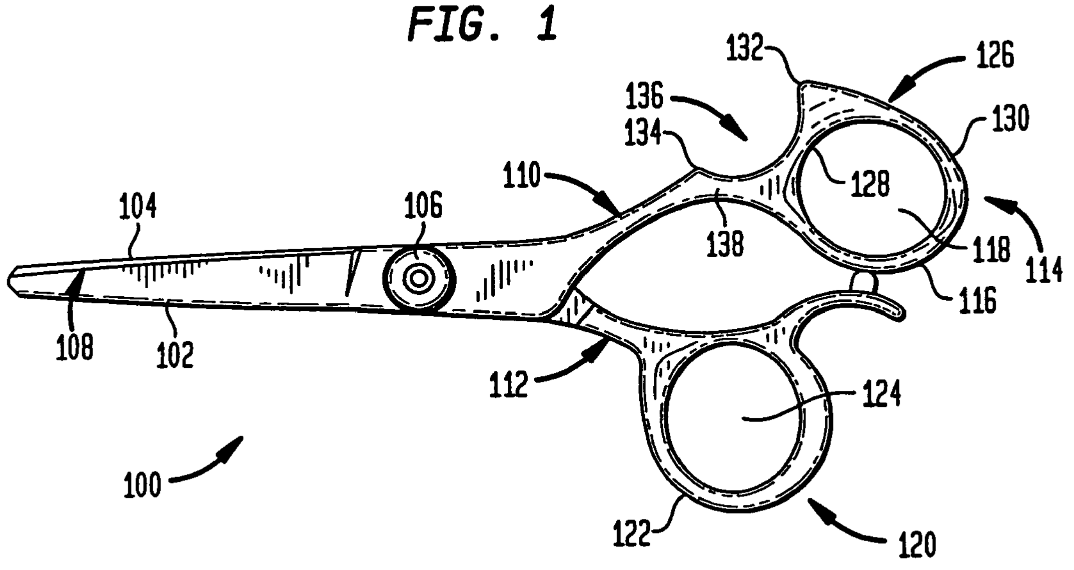
FIG. 1 is a top plan view of a pair of scissors incorporating spaced-apart projections providing middle finger support in accordance with one embodiment of the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Referring now to the drawings, wherein like reference numerals represent like elements, there is shown in FIG. 1 a pair of scissors generally designated by reference numeral 100. The scissors 100 includes a pair of elongated blades 102, 104, which are pivotably connected together at pivot point 106 by any conventional assembly as is well known in the scissor's art. Each of the blades 102, 104 includes a cutting region 108 disposed forward of the pivot point 106 and a respective handle 110, 112. Handle 110 is further provided with a handle extension 114 formed by an arcuate shaped member 116 that defines a finger receiving opening 118. In a similar manner, the handle 112 is provided with a handle extension 120 formed by an arcuate shape member 122 defining a finger receiving opening 124.

The arcuate shape member 116 of handle extension 114 includes a crest 126 arranged generally midway along the upper portion of the arcuate shape member as shown in FIG. 1. The arcuate shape member 116 is further defined by a sloped segment 128 generally directed toward the cutting region 108 and a sloped segment 130 generally directed away from the cutting region. As illustrated, the crest 126 is generally located at the apex of the arcuate shaped member centered between the sloped segments 128, 130.

The finger receiving opening 118 is generally a circular shaped opening, or a variation thereof, such as an oval shaped opening and the like. The finger receiving opening 118 is therefore defined by the arcuate shaped member 116 that defines the slope segments 128, 130 extending on either side of the crest 126.

A projection 132 is formed extending outwardly from the sloped segment 128 along the arcuate shaped member 116. Another projection 134 is formed extending outwardly from the handle 110 arranged spaced from projection 132 to provide a finger receiving opening 136 therebetween. As shown, the projection 132 is arranged generally adjacent the crest 126 of the arcuate shaped member 116. The resulting finger receiving opening 136 is partially bordered by the arcuate side surfaces of the projections 132, 134 and an intervening arcuate shaped portion 138 of the handle 110.

In accordance with one embodiment of the present invention, the projections 132, 134 are triangular in shape, projection 132 being larger than projection 134. The projections 132, 134 can be integrally formed during manufacture of the handle 110 using conventional manufacturing techniques. It is also contemplated that the projections 132, 134 may have other shapes, such as square, cylindrical, C-shaped, hook-shaped, polygonal, or any other shape that is suitable for defining a finger receiving opening 136 therebetween. Although the projections 132, 134 are preferably integrally formed with the handle 110, they may be detachable or separately secured to the handle. For example, the projections 132, 134 may be detachable by including a threaded portion adapted to receive a threaded portion on the handle 110, for example, threaded stud and threaded opening combination. In addition, the projections 132, 134 may be provided in separate pieces that are welded or otherwise attached to the handle 110. The projections 132, 134 may also be formed of polymer materials that can be snapped fit about portions of the handle 110 and the arcuate shaped member 114.

In use of the scissors, one's thumb is inserted into the finger receiving opening 124, one's ring finger is inserted into finger receiving opening 118, and one's middle finger is received within the finger receiving opening 136. In certain circumstances, the operator may place their middle finger into the finger receiving opening 118 and their index finger into the finger receiving opening 136. In either event, the finger receiving opening 136 is adapted to restrict sliding of the person's finger up the slope segment 128, passed the crest 126, and onto the slope segment 130. The projection 132 effectively acts as a stop in the rearward direction to preclude displacement of one's finger from the proper cutting position within the finger receiving opening 136. In a similar manner, projection 134 acts as a stop, restricting sliding of one's finger forwardly along the handle 110.

The present invention has thus far been described with respect to the preferred embodiment. In this regard, the preferred embodiment includes a pair of spaced apart projections 132, 134. As noted, projection 132 functions as a stop to restrict the person's finger from sliding up and over the arcuate shaped member 116 defining the handle extension 114. It is contemplated that only a single projection 132 is required in accordance with the broad aspects of the present invention. Although preferred, it is not a requirement that projection 134 be incorporated into the construction of the handle 110.

Figure 2:
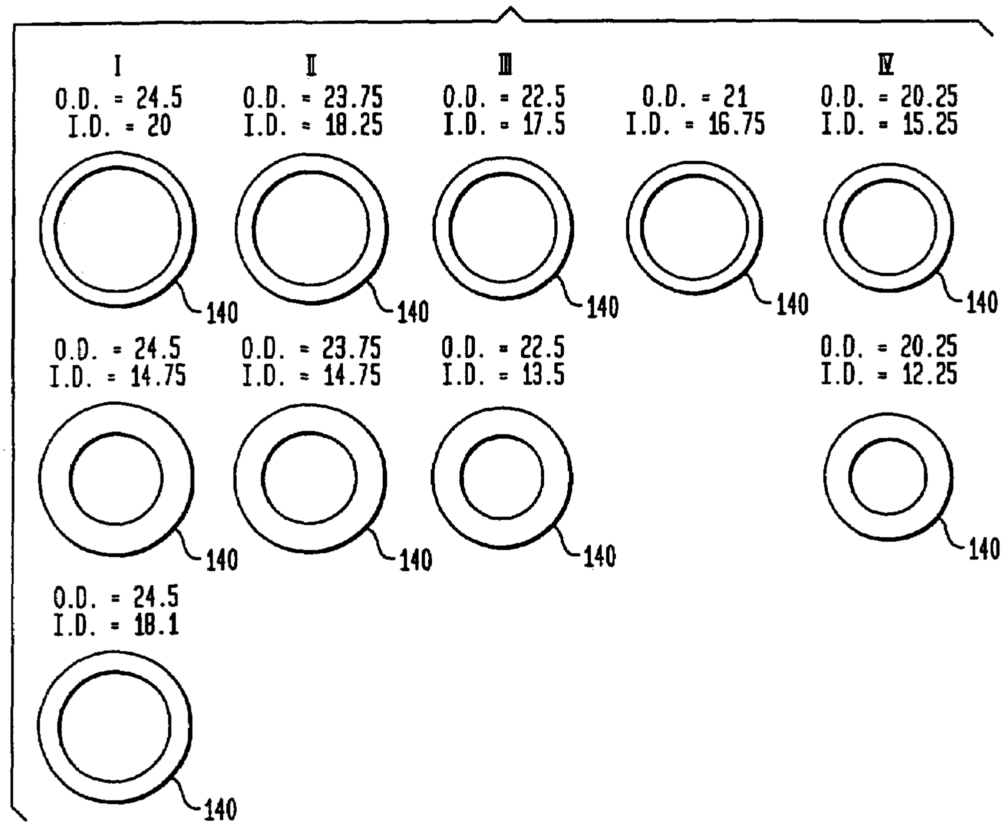
FIG. 2 is a top plane view of a plurality of ring inserts illustrated in groups of predetermined outside and inside diameters in accordance with one embodiment of the present invention.
Figure 3:
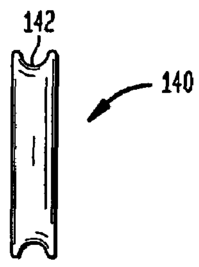
FIG. 3 is a front elevational view of a ring insert constructed in accordance with one embodiment of the present invention.

In order to adapt a pair of scissors to the finger size of a particular user, the present invention provides a plurality of ring inserts 140 as shown in FIGS. 2 and 3. The ring inserts are constructed in the nature of a circular shaped ring from any one of a number of known polymer materials possessing resilient and/or flexible properties. The ring inserts 140 are shaped to conform generally to the shape of the finger receiving openings 118, 124, for example, circular, oval, or the like. However, it is contemplated that due to the flexible and/or resilient nature of the ring inserts, circular shaped ring inserts can be adapted for use in oval shaped finger receiving openings 118, 124. As best shown in FIG. 3, each of the ring inserts 140 has an outer edge circumscribed by a generally continuous groove 142 or other such recess, the purpose of which will be described hereinafter.

In order to adapt a pair of scissors to the finger size of the operator, the ring inserts 140 are provided in various combinations of outside diameter and inside diameter. In this regard, the ring inserts 140 are provided in pairs or groups of at least two ring inserts to be received within a finger receiving opening 118, 124 of a designated size, while accommodating for different user finger sizes. In accordance with the preferred embodiments of the present invention, the ring inserts 140 are provided in a plurality of groups, each group including at least a pair of ring inserts having the same outside diameter, but different inside diameters. The ring inserts 140 may be packaged in a kit containing a single group of ring inserts, or a plurality of groups of ring inserts, each group including at least a pair of inserts of the same outside diameter, but different inside diameters. It is further contemplated that the groups may include more than a pair of ring inserts 140 to accommodate a greater range of operator finger sizes.

Referring again to FIG. 2, there is illustrated by way of one embodiment a kit including three ring inserts 140 designated as group I. Each of the ring inserts 140 have an outside diameter of about 24.5 millimeters, and an inside diameter of about 20 millimeters, 18.1 millimeters, and 14.75 millimeters, respectively. A kit of ring inserts 140 may also include those shown in group II including a pair of ring inserts having an outside diameter of about 23.75 millimeters and an inside diameter of about 18.25 millimeters and 14.75 millimeters, respectively. A kit of ring inserts can further include the pair of ring inserts 140 shown in group III having an outside diameter of about 22.5 millimeters and an inside diameter of about 17.5 millimeters and 13.5 millimeters, respectively. Still further, a ring insert kit may include the pair of ring inserts shown in group IV having an outside diameter of about 20.25 millimeters and an inside diameter of about 15.25 millimeters and 12.25 millimeters, respectively.

Other outside and inside diameters are contemplated within the present invention although not specifically identified. The above described ring inserts have their inside diameter ranging from about 4.25 millimeters to about 9.75 millimeters smaller than their outside diameter. The size difference in the described ring inserts is in the range of about 18% to about 40% smaller inside diameter than the outside diameter.

It is to be understood that any number of ring inserts 140 may be included in any one of the aforementioned groups I-IV. In addition, a kit of ring inserts 140 may include the insert rings of any single one group or the insert rings of a plurality of groups I-IV, packaged together, commingled or separately maintained in identified groups. Thus, the term "group" is not intended to mean that the plurality of ring inserts 140 are required to be identifiable or provided in separate groups thereof. As such, the plurality of ring inserts 140 from more than one group can be commingled with each other for selection by the user.

In a preferred embodiment, each of the ring inserts 140 shown in groups I-IV will be included in a single kit. In addition, odd sized ring inserts may be included in any one of the aforementioned groups and packaged in one of the aforementioned ring insert kits. One such ring insert 146 is shown in FIG. 2 having an outside diameter of about 21 millimeters and an inside diameter of about 16.75 millimeters. It should be appreciated that a kit of ring inserts includes at least one pair of ring inserts 140 having the same outside diameter, but a different inside diameter. The ring insert kit may have any number of groups including any number or ring inserts 140 of various sizes predetermined to accommodate the various scissor's constructions and finger sizes of the operators.

Figure 4:
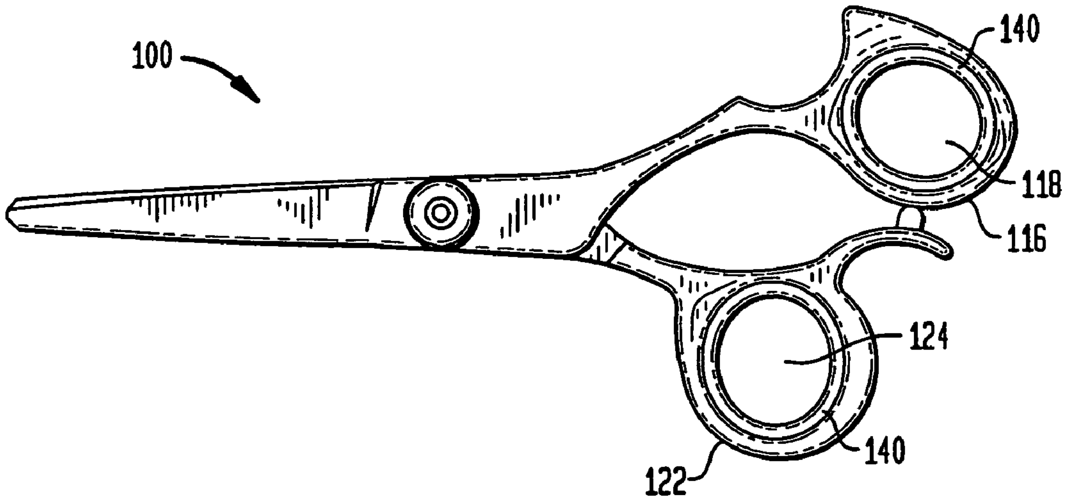
FIG. 4 is a top plane view of a pair of scissors having a pair of ring inserts inserted therein in accordance with one embodiment of the present invention.

Turning to FIG. 4, the user selects an appropriate ring insert 140 for each of the finger receiving openings 118, 124 if required. Once selected, the ring insert 140 is pressed into the finger receiving opening 118, 124 whereby the arcuate shaped member 116, 122 is received within the groove 142 extending around the periphery of the ring insert. Depending upon the resiliency and flexibility of the ring insert 140, the ring insert may be force fit into the finger receiving openings 118, 124, or twisted into a reduced diameter, and allowed to assume its pretwisted shape to snuggly engage the arcuate shaped member 116, 122 within the ring insert's groove 142. In this manner, ring inserts 140 may be inserted and removed from the scissors 100 as may be required of the user. The ring inserts 140, by proper selection, provide an opening of proper size to accommodate the size of the user's fingers.

The ring inserts 140 may be sized manually by the user placing his finger and thumb within one of the ring inserts to determine its fit. Once the appropriate ring insert 140 is selected, the ring insert may be fit into one of the ring receiving openings 118, 124 of the scissors 100. The procedure for selecting a ring insert 140 in this manner, is a trial and error procedure that may be repeated as may be required to obtain the proper scissors fit. This is facilitated by the ring inserts 140 being removable once inserted into the scissors 100.

Figure 5:
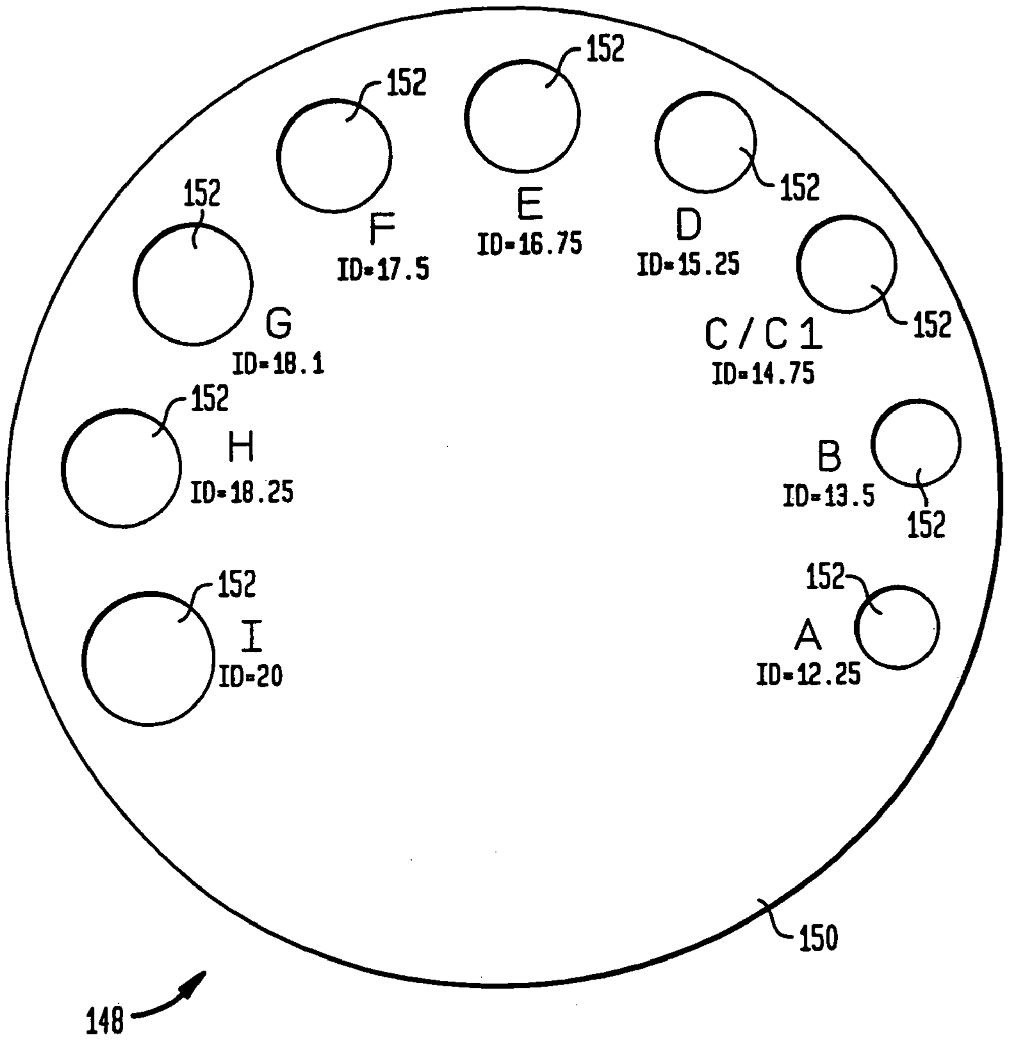
FIG. 5 is a top plane view of a sizing template for selecting a ring insert constructed in accordance with one embodiment of the present invention.

The ring inserts 140 may also be selected with the aide of a template 148 as shown in FIG. 5. The template 148 is constructed in the nature of a generally flat plate 150 including a plurality of circular holes 152. The holes 152 may be arranged on the template 148 in any arrangement and any location as desired. In addition, the template 148 although shown as circular, may have any shape and predetermined thickness. It should therefore be appreciated that the plate 150 provides a support for the hole 152.

In accordance with the preferred embodiment, the holes 152 are sized to have a diameter corresponding to the inside diameter of the ring inserts 140, 146 as shown in FIG. 2. For ease of use, the holes 152 are arranged about the periphery of the plate 150 in order of increasing or decreasing inside diameter. However, the holes 152 may be arranged in the plate 150 at any location or in a random pattern or array.

In selecting a ring insert 140, the user inserts his ring or other finger into one of the holes 152 to determine its fit. In this regard, the inside diameter of the hole 152 should fit snuggly about the person's ring finger between the first and second knuckle from the tip of the person's finger. This process of measurement is repeated using the person's thumb to determine a snug fit between the mid-point of the thumbnail and the bottom of the thumb cuticle. The corresponding inside diameter of the selected holes 152 are noted so as to select a corresponding ring insert 140.

By way of example, upon measuring a ring finger size of 17.9 millimeters, the user would select the corresponding ring insert 140 from group I having the same inside diameter and an outside diameter of 24.5 millimeters. The ring insert 140 is placed into the finger receiving opening 118 to size the opening for the person's ring finger. By way of another example, upon identifying a finger size of 14.75 millimeters, the user can select one of the ring inserts 140 from either group I or group II, corresponding to outside diameters of 24.5 millimeters and 23.75 millimeters, respectively. The user would select the appropriate ring insert 140, which best fits within the required finger receiving opening 118, 124. Hope designated C/C1 corresponds to the two insert rings 140 both having an inside diameter of 14.75 millimeters but different outside diameters, i.e., 24.5 and 23.75 millimeters.

The ring inserts 140 have been described as being singularly inserted into one of the finger receiving openings 118, 124. However, it is contemplated that a pair of ring inserts 140 may be nested together, as may be required, to accommodate the size of a particular finger receiving opening 118, 124. For example, if a person's finger measures 12.25 millimeters pursuant to template 148, the correspondence ring insert 140 may be selected from Group IV having an outside diameter of 20.25 millimeters. If this outside diameter is too small for the finger receiving opening 118, the ring insert 140 may be nested within the ring insert from group I having an inside diameter of 20 millimeters and an outside diameter of 24.5 millimeters. This combination provides a relatively small inside diameter and a relatively large outside diameter providing greater versatility to the ring inserts.

By way of further illustration only, and with reference to FIG. 5, smaller ring inserts 140 may be inserted into larger ring inserts such as by the following examples: ring insert A into ring inserts H or I: ring insert D into ring inserts F, G, or H: ring insert E into ring inserts F, G, or H: ring inserts F into ring insert I, etc.

To facilitate the selection of the appropriate ring insert 140, the holes 152 and ring inserts may be correspondingly coded such as by the use of color, letters, numbers, symbols, and combinations thereof. In accordance with one embodiment, each of the holes 152 on the template 148 are designated by the appropriate inside diameter and a letter that may be printed in a predetermined color. The ring inserts 140 may be similarly formed from polymer material that has the same color as the holes 152 of the same inside diameter. It is also contemplated that the ring inserts 140 may be stamped with a corresponding letter or inside diameter measurement. Accordingly, the holes 152 may be coded to a corresponding one of the ring inserts 140 using a variety of techniques.

Figure 6:
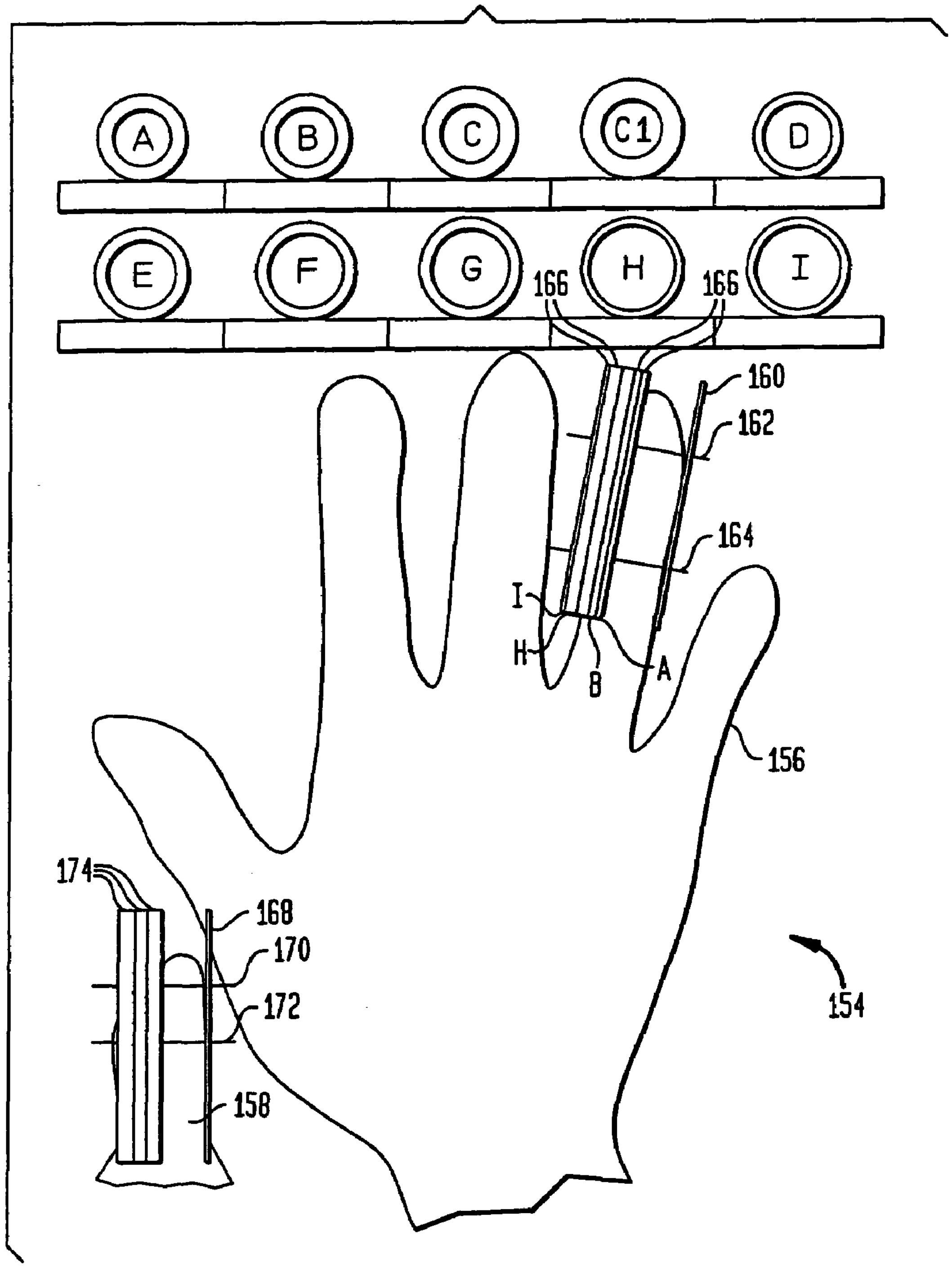
FIG. 6 is a top plane view of a sizing template for selecting a ring insert constructed in accordance with another embodiment of the present invention.

Referring to FIG. 6, there is shown a template 154 in accordance with another embodiment of the present invention. The template 154 is in the nature of a graphic illustration 156 of a person's hand, and optionally, a separate graphic illustration 158 of a person's thumb. The graphic illustrations 156, 158 may be printed on a document supplied to the scissor's user along with the ring insert kit. It is also contemplated that the template 154 may be included in a software package or displayed on a computer screen at the point of purchase of the scissors. In this regard, the user would place his hand, as to be described more fully hereinafter, on the illustration 156 as it appears on a computer screen.

As noted, the user will place his hand overlying the hand illustration 156 with the edge of one's ring finger aligned with reference line 160. The user will press his ring finger lightly noting the area between the first and second knuckles generally identified by the two spaced apart knuckle reference lines 162, 164. The user will select the appropriate color/letter that matches the ring finger width associated with one of the ring finger reference lines 166. In this regard, each of the ring finger reference lines 166 may be of a different color, designated by a different letter, number, symbol, or combinations thereof. Based upon the designated ring finger reference line 166, the user can select the appropriate ring insert 140 from the ring insert kit.

In a like manner, the user places his thumb on the thumb illustration 158 aligned with the reference line 168. The user notes the area between the mid-thumb nail and bottom of the cuticle designated generally between thumb reference lines 170, 172. The thumb width is designated by selecting one of the thumb reference lines 174, which may also be coded to one of the ring inserts 140 in the manner as described with respect to the ring finger reference lines 166. Although the thumb illustration 158 has been shown separate from the hand illustration 156, it is contemplated that the thumb illustration may be included as part of the hand illustration. Having selected the appropriate ring inserts 140 for the user's ring finger and thumb, the ring inserts are inserted into the finger receiving openings 118, 124 of the scissors 100.

Although the present invention has been described with particular applicability to a pair of scissors 100, it is to be understood that any hand implement that is manipulated by one's fingers in a manner similar to a pair of scissors via finger receiving openings have applicability to the ring inserts and templates of the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A scissors insert kit adapted for resizing the size of a ring finger opening in a pair of scissors, said ring finger opening sized to receive a single finger of a user, said kit comprising a plurality of ring finger inserts having an outside diameter and an inside diameter, said plurality of ring finger inserts forming at least one group comprising at least a first ring finger insert and a second ring finger insert, said first and second ring finger inserts within said at least one group having the same outside diameter and a different inside diameter, said first and second ring finger inserts sized to fit a single finger of a user and be non-rotationally secured within said ring finger opening of said pair of scissors for resizing the size thereof, wherein the outside diameter of the first and second ring inserts within one of the groups is different from the outside diameter of the first and second ring inserts in another one of the groups.

2. The scissors insert kit of claim 1, wherein the inside diameter of the ring finger inserts within one of said groups is different from the inside diameter of the ring finger inserts within another one of said groups.

3. The scissors insert kit of claim 1, wherein the inside diameter of the ring finger inserts within one of said groups is different from the inside diameter of the ring finger inserts within another one of said groups.

4. The scissors insert kit of claim 1, wherein the inside diameter of the ring finger inserts within one of said groups is different from the inside diameter of the ring finger inserts within another one of said groups.

5. The scissors insert kit of claim 2, wherein the outside diameter of at least one ring finger insert within said groups is progressively smaller.

6. The scissors insert kit of claim 5, wherein the inside diameter of at least one ring finger insert within said groups is progressively smaller.

7. The scissors insert kit of claim 2, wherein the inside diameter of at least one ring finger insert within said groups is progressively smaller.

8. The scissors insert kit of claim 1, further being adapted to resize a thumb opening in said pair of scissors, said at least one group further including at least one thumb insert having an inside diameter and an outside diameter different from an outside diameter and an inside diameter of said first and second ring finger inserts.

9. The scissors insert kit of claim 8, wherein said at least one thumb insert is sized to receive the user's thumb between the tip and the first knuckle thereof.

10. The scissors insert kit of claim 1, wherein said first and second ring finger inserts are sized to receive the user's ring finger between the first and second knuckles thereof.

11. The scissors insert kit of claim 1, wherein each of said ring finger inserts includes an outer edge having a groove circumscribing said ring finger insert.

12. A scissors insert kit comprising a plurality of polymer ring inserts each having an outside diameter and an inside diameter, said plurality of ring inserts forming a plurality of groups, each group comprising at least a first ring insert and a second ring insert, said first and second ring inserts within a group having the same outside diameter and a different inside diameter, wherein said first and second ring inserts within a group are sized to fit a single finger of a user and be non-rotationally secured within a ring finger of a pair of scissors, wherein the outside and inside diameters of the first and second ring inserts within one of the groups are different from the outside and inside diameters of the first and second ring inserts in another one of the groups.

13. A scissors insert kit of claim 12, wherein said outside diameter of said ring inserts range from about 24.5 mm to about 20.25 mm.

14. A scissors insert kit of claim 12, wherein said inside diameter of said ring inserts range from about 20.0 mm to about 12.25 mm.

15. A scissors insert kit of claim 12, wherein each of said ring inserts includes an outer edge having a groove circumscribing said ring insert.

16. A kit for modifying a pair of scissors by resizing a ring finger opening thereof, said ring finger opening sized to receive a single finger of a user, said kit comprising a pair of scissors having a ring finger opening and a thumb opening; and a plurality of ring finger inserts having an outside diameter and an inside diameter, said plurality of ring finger inserts forming at least one group comprising at least a first ring finger insert and a second ring finger insert, said first and second ring finger inserts within said at least one group having the same outside diameter and a different inside diameter; said first and second ring finger inserts sized to fit a single finger of a user and be non-rotationally secured within said ring finger opening of said pair of scissors for resizing the size thereof, wherein the outside and inside diameters of the first and second ring inserts within one of the groups are different from the outside and inside diameters of the first and second ring inserts in another one of the groups.

17. The kit of claim 16, wherein the inside diameter of the ring finger inserts within a group is different from the inside diameter of the ring finger inserts within another group.

18. The kit of claim 16, wherein the outside diameter of at least one ring finger insert within the groups is progressively smaller.

19. The kit of claim 16, wherein the inside diameter of at least one ring finger insert within the group is progressively smaller.

20. The kit of claim 16, further being adapted to resizes said thumb opening in said pair of scissors by said at least one group further including at least one thumb insert.

21. The kit of claim 20, wherein said at least one thumb insert has an inside diameter and an outside diameter different from an outside diameter and an inside diameter of said first and second ring finger inserts.

22. The kit of claim 21, wherein said at least one first thumb insert is sized to receive the user's thumb between the tip and the first knuckle thereof.

23. The kit of claim 16, wherein said first and second ring finger inserts are sized to receive the user's ring finger between the first and second knuckle thereof.

24. The kit of claim 16, wherein said inside diameter of said ring inserts range from about 20.0 mm to about 12.25 mm.

25. The kit of claim 16, further including a template for selecting a ring finger insert from one of said groups for said pair of scissors based upon a person's finger size, said template comprising a plate having a plurality of holes each of a different size for identifying the size of a person's finger between a first and second knuckle thereof, and indicia selected from the group consisting of numbers, letters, symbols, colors and combinations thereof uniquely associated with one of said holes and one of the ring inserts.

26. The kit of claim 25, wherein said outside diameter of said ring finger inserts range from about 24.5 mm to about 20.25 mm.

27. The kit of claim 25, wherein said inside diameter of said ring finger inserts range from about 20.0 mm to about 12.25 mm.

28. The kit of claim 16, further including a template for selecting a ring insert from said at least one group for a scissors based upon a person's finger size, said template comprising means for identifying the size of a person's finger between a first and second knuckle thereof, and means for associating a ring insert of predetermined size with the identified size of the person's finger.

29. The kit of claim 21, further including a plurality of said thumb inserts, means for identifying the size of a person's thumb between the bottom of the person's thumb cuticle and the middle of the person's thumb nail, and means for associating a thumb insert of predetermined size with the identified size of the person's thumb.

30. A kit for modifying a pair of scissors by resizing a ring finger opening thereof, said kit comprising a pair of scissors having a ring finger opening, said ring finger opening sized to receive a single finger of a user; and a plurality of polymer ring finger inserts each having an outside diameter and an inside diameter, said plurality of ring finger inserts forming a plurality of groups, each group comprising at least a first ring finger insert and a second ring finger insert, said first and second ring finger inserts within a group having the same outside diameter and a different inside diameter, wherein said first and second ring finger inserts within a group are sized to fit a single finger of a user and be non-rotationally secured within said ring finger opening of said pair of scissors, wherein the outside and inside diameters of the first and second ring finger inserts within one of said groups are different from the outside and inside diameters of the first and second ring finger inserts in another one of the groups.

31. The kit of claim 30, wherein said outside diameter of said ring finger inserts range from about 24.5 mm to about 20.25 mm.

32. The kit of claim 30, wherein said inside diameter of said ring finger inserts range from about 20.0 mm to about 12.25 mm.

33. The kit of claim 30, wherein each of said ring finger inserts includes an outer edge having a groove circumscribing said ring finger inserts.

34. A method for selecting a ring finger insert for resizing a pair of scissors having a ring finger opening, said ring finger opening sized to receive a single finger of a user, said method comprising providing a plurality of ring finger inserts having an outside diameter and an inside diameter, said plurality of ring finger inserts forming a plurality of groups comprising at least a first ring finger insert and a second ring finger insert, said first and second ring finger inserts within each one group having the same outside diameter wherein the outside diameter of the first and second ring inserts within one of the groups is different from the outside diameter of the first and second ring inserts in another one of the groups; wherein said first and second ring finger inserts are sized to fit a single finger of a user and be non-rotationally secured within said ring finger opening of said pair of scissors selecting one of said ring finger inserts having an inside diameter to receive the person's finger between the first and second knuckles thereof; and inserting the selected ring finger insert into said ring finger opening of said pair of scissors.

35. The scissors insert kit of claim 34, wherein the inside diameter of the ring finger inserts within one of said groups is different from the inside diameter of the ring finger inserts within another one of said groups.

36. The method of claim 34, wherein said pair of scissors includes a thumb opening for receiving a thumb insert.

37. The method of claim 36, further including providing a thumb insert having an inside diameter and an outside diameter different from an outside diameter and an inside diameter of said first and second ring finger inserts; and inserting said thumb insert into said thumb opening of said pair of scissors.

38. The method of claim 37, wherein said thumb insert is sized to receive the user's thumb between the tip and the first knuckle thereof.

39. A method for selecting a ring insert for resizing a pair of scissors having a ring finger opening, said method comprising providing a plurality of polymer ring inserts each having an outside diameter and an inside diameter, said plurality of ring inserts forming a plurality of groups, each group comprising at least a first ring insert and a second ring insert, said first and second ring inserts within a group having the same outside diameter and a different inside diameter, wherein said first and second ring finger inserts within a group are sized to fit a single finger and be non-rotationally secured within said ring finger opening of said pair of scissors, wherein the outside and inside diameters of the first and second ring inserts within one of said groups are different from the outside and inside diameters of the first and second ring inserts in another one of the groups; and inserting the selected ring insert into said ring finger opening of said pair of scissors.

40. The method of claim 39, wherein said selected ring insert receives a person's ring finger between the person's first and second knuckles.

41. A scissors insert kit comprising a plurality of ring inserts having an outside diameter and an inside diameter, said plurality of ring inserts forming a plurality of groups comprising at least a first ring insert and a second ring insert, wherein the outside and inside diameters of the first and second ring inserts within one of the groups are different from the outside and inside diameters of the first and second ring inserts in another one of the groups, said first and second ring inserts within each group having the same outside diameter and a different inside diameter, wherein said first and second ring finger inserts within a group are sized to fit a single finger of a user and be non-rotationally secured within said ring finger opening of said pair of scissors, wherein the inside diameter of said ring inserts is in the range of about 4.25 millimeters to about 9.75 millimeters smaller than the outside diameter of said ring inserts.

42. The scissors insert kit of claim 41, wherein the difference between the inside diameter and outside diameter is the same for a plurality of said ring inserts.

43. A scissors insert kit comprising a plurality of ring inserts having an outside diameter and an inside diameter, said plurality of ring inserts forming a plurality of groups comprising at least a first ring insert and a second ring insert, said first and second ring inserts within said at least one group having the same outside diameter and a different inside diameter, wherein the outside and inside diameters of the first and second ring inserts within one of the groups are different from the outside and inside diameters of the first and second ring inserts in another one of the groups, wherein said first and second ring finger inserts within each group are sized to fit a single finger of a user and be non-rotationally secured within said ring finger opening of said pair of scissors, wherein the inside diameter of said ring inserts is in the range of about 18% to about 40% smaller than the outside diameter of said ring inserts.

44. The scissors insert kit of claim 43, wherein the difference between the inside diameter and outside diameter is the same percentage for a plurality of said ring inserts.

* * * * *